J. E. HOUSEHOLDER.
PUMP VALVE.
APPLICATION FILED FEB. 21, 1910.

982,677.

Patented Jan. 24, 1911.

ATTEST
E. M. Fisher
J. C. Musson

INVENTOR
JAMES E. HOUSEHOLDER
By Fisher & Moore
ATTYS.

UNITED STATES PATENT OFFICE.

JAMES E. HOUSEHOLDER, OF CLEVELAND, OHIO, ASSIGNOR OF ONE-HALF TO CHARLES W. CARLSON, OF CLEVELAND, OHIO.

PUMP-VALVE.

982,677.　　　　　Specification of Letters Patent.　　Patented Jan. 24, 1911.

Application filed February 21, 1910. Serial No. 545,136.

*To all whom it may concern:*

Be it known that I, JAMES E. HOUSEHOLDER, citizen of the United States, residing at Cleveland, in the county of Cuyahoga and State of Ohio, have invented certain new and useful Improvements in Pump-Valves, of which the following is a specification.

My invention relates to pump valves, and the invention consists in a metallic valve constructed and adapted to operate substantially as shown and described and particularly pointed out in the claim.

Figure 1:
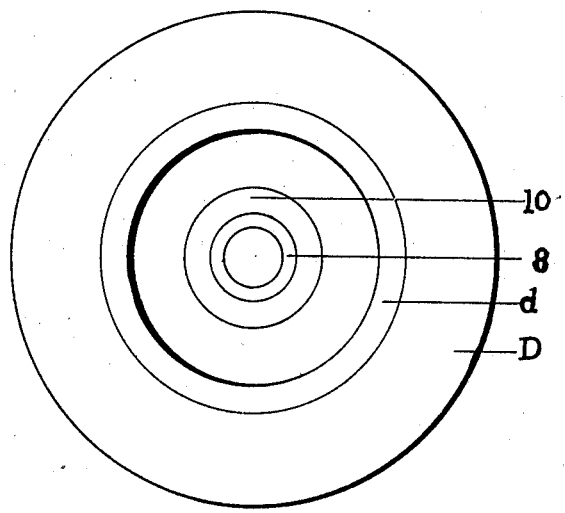
Figure 2:
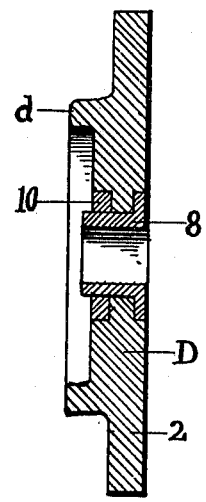
Figure 3:
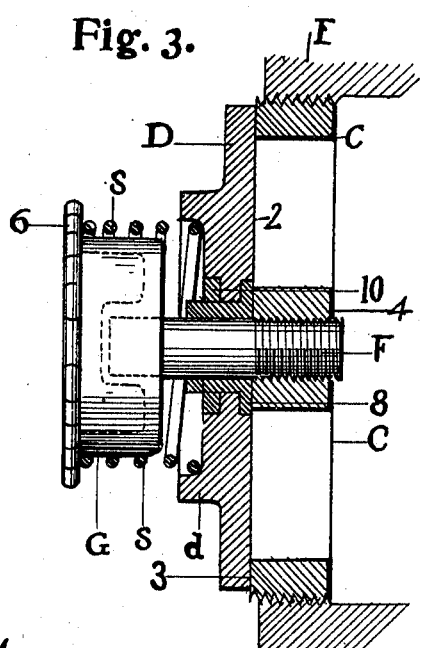
Figure 4:
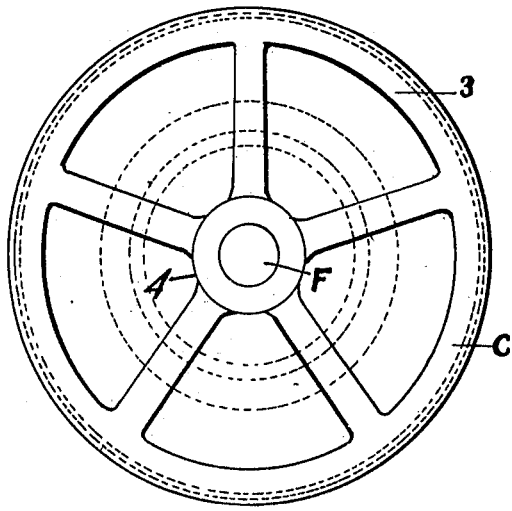

In the accompanying drawings, Figure 1 is a side elevation of the valve, and Fig. 2 is a cross section thereof. Fig. 3 is a cross section of the valve and its immediate mountings, and Fig. 4 is an elevation of the spider supporting the valve.

In the drawings the disk D is shown as flat on its side 2, which is adapted to seat at or about its edge on the edge of spider C, which is suitably faced at 3 to make a close seat for the valve. The said spider is threaded about its periphery and removably fixed in casing or support E according to the position occupied by the valve. The said spider also has a central hub 4 screw threaded internally and adapted to receive the stem or screw F which serves as a support for the valve and the spring S and hollow cap or shell G about which said spring is coiled, and which also serves as a head for said stem or screw and is provided with a serrated or milled edge 6 adapted to be gripped by the hand to turn the screw and tighten or loosen it as conditions may require. Thus, if for any reason the valve does not seat promptly or greater pressure by the spring is required to cause the valve to seat closely the said shell can be turned and the screw will tighten in spider C.

Now, I have anticipated and remedied defects in the rubber valve by employing a light metal, such as aluminum, for making the valve itself and then overcoming any tendency to wear and become leaky at its center by inserting a bushing or thimble 8 therein the full depth of the valve or more and slipping a close fitting washer 10 over said thimble against the valve on the other side, and in this instance shown as recessed into the side of the valve. The said bushing or thimble is designed to be of a good wearing metal, say fairly hard brass, so as to endure for an indefinite period as the valve travels back and forth in opening and closing an infinite number of times daily on support F, and which operation was and is so destructive to a rubber valve, or the like. The said valve has a hole centrally through the same with an annular tongue centrally or substantially midway between its sides and annular recesses on opposite sides of said tongue adapted to receive the flange on thimble 8 in the inner of said recesses and the washer 10 in the outer of said recesses, as shown. First and last the thimble 10 is thus provided with an outer bearing surface the full thickness or depth of the valve. If extra means be found necessary to hold washer 10 in place it may be employed, but ordinarily the end of spring S will lie across the same and hold it in place. Said spring otherwise is engaged about cup or cap G, and the valve D has a bead or rim *d* about its inside of a face width corresponding to the width of the spring S and so that the said spring will seat within the said rim and be centered and held thereby from slipping or working off center and thus exerting an uneven pressure on the valve. This is material in a valve mounting of this kind, especially when the valve is located on a horizontal support, and the natural tendency of the spring is to drop or work downward. The disk or valve D is also shown as somewhat deeper within said rim or rib *d* than without the same, and the said valve is to be made as light as possible consistent with perfect rigidity and uniform seating on the casing or seating member E, of whatever kind it may be. If for any reason a valve should become incapacitated it can be substituted by another, but if the defect should be in the wearing of the bushing the valve can be repaired by simply substituting new bushing, an easy and inexpensive remedy. Heretofore with rubber valves the valve itself had to be thrown away as worthless when it wore a leak at its center, or anywhere else for that matter. My valve can be ground and reground to a perfect face at any time. Rib *d* serves a further advantageous purpose in that it strengthens the otherwise light aluminum disk, being situated approximately midway between the periphery of the disk and its central opening. The additional thickness of the disk inside of rib *d* is also intended to strengthen the disk as well as provide a sufficiently wide bearing therefor on stem F, and particularly in the event bushing sleeve 8 be omitted. The head G may be threaded upon stem F or otherwise rigidly fixed thereon, and in this instance is shown in dotted lines as having a socket in which said stem is secured.

What I claim is:

In pump valves, a casing provided with a valve seat, a rigid valve made of aluminum and having a hole through its center with an annular tongue in the middle thereof and annular recesses on opposite sides of said tongue, a hard metal thimble fitting snugly within said tongue and having a flanged head occupying the inner of said recesses and a metallic washer occupying the outer of said recesses about said thimble, a centrally fixed stem over which said thimble and valve are slidably mounted, a head on said stem and a spiral spring confined about said head and bearing on the said valve.

In testimony whereof I affix my signature in presence of two witnesses.

JAMES E. HOUSEHOLDER.

Witnesses:
  E. M. FISHER,
  F. C. MUSSUN.